(12) United States Patent
Suwa et al.

(10) Patent No.: US 8,808,469 B2
(45) Date of Patent: Aug. 19, 2014

(54) NITROCARBURIZED RAW MATERIAL FOR CRANKSHAFTS AND METHOD FOR MANUFACTURING THE SAME

(75) Inventors: Satoru Suwa, Wako (JP); Daiji Kawaguchi, Wako (JP); Atsushi Murakami, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 272 days.

(21) Appl. No.: 12/922,247

(22) PCT Filed: Feb. 25, 2009

(86) PCT No.: PCT/JP2009/000820
§ 371 (c)(1),
(2), (4) Date: Sep. 13, 2010

(87) PCT Pub. No.: WO2009/122653
PCT Pub. Date: Oct. 8, 2009

(65) Prior Publication Data
US 2011/0017351 A1    Jan. 27, 2011

(30) Foreign Application Priority Data
Mar. 31, 2008 (JP) ................... 2008-089232

(51) Int. Cl.
*C23C 8/56* (2006.01)
(52) U.S. Cl.
USPC .......................................... 148/219; 148/318

(58) Field of Classification Search
USPC .................................................. 148/219, 318
See application file for complete search history.

(56) References Cited

U.S. PATENT DOCUMENTS

2007/0144619 A1* 6/2007 Asai et al. .................... 148/318

FOREIGN PATENT DOCUMENTS

| JP | 204-162161 | 6/2004 |
| JP | 2007-231302 | 9/2007 |

OTHER PUBLICATIONS

JP Office Action; dated Jan. 15, 2013; Issued on corresponding JP Application No. 2008-089232.

* cited by examiner

*Primary Examiner* — Jessee Roe
(74) *Attorney, Agent, or Firm* — Squire Patton Boggs (US) LLP

(57) ABSTRACT

It is devised to further enhance strength and straightening ability of a nitrocarburized raw material for crankshafts. A nitrocarburized raw material for crankshafts is formed so as to have a composition composed of C, Si, Mn, Cu, Ni, Cr, V, S, s-Al, Ca and N in prescribed % by mass, with the balance being Fe and inevitable impurities and having a structure of ferrite+pearlite; after smelting a steel having the foregoing composition, hot forging is performed; thereafter, a normalizing treatment is applied to the subject hot forged material at a treatment temperature in the range of from 780° C. to 850° C.; and straightening process for correcting bending to be caused due to the nitrocarburizing treatment is later applied.

2 Claims, 3 Drawing Sheets

NITROCARBURIZED RAW MATERIAL FOR CRANKSHAFTS AND METHOD FOR MANUFACTURING THE SAME

TECHNICAL FIELD

The present invention relates to a nitrocarburized raw material for crankshafts to which a nitrocarburizing treatment as a surface treatment is applied and a method for manufacturing the same.

BACKGROUND ART

A microalloyed steel now has been widely used as a raw material of a machine structural part. For example, in a microalloyed steel having vanadium (V) added therein, V which is added in a trace amount forms a minute carbide and contributes to realization of high strength of the part.

For example, for crankshafts as the machine structural part, for the purpose of increasing wear resistance or fatigue strength, a nitrocarburizing treatment such as a salt bath nitriding treatment, a gas nitrocarburizing treatment, a plasma nitriding treatment, etc. may be possibly applied after the foregoing machining. In general, it is known that the nitrocarburizing treatment is low in the generation amount of a strain after the heat treatment. But, at the time of manufacturing a crankshaft, for the purpose of further enhancing the precision, straightening process for correcting bending to be inevitably caused due to the nitrocarburizing treatment is applied. However, there were involved problems that the microalloyed steel to which a nitrocarburizing treatment has been applied is lower in straightening ability than a thermal refined steel to which a nitrocarburizing treatment has been applied and that the fatigue strength is easily lowered due to influences of a stress strain generated on the surface at the time of straightening process. Then, in order to enhance the straightening ability and fatigue strength of a microalloyed steel, various proposals have been made (see, for example, Patent Document 1)

Patent Document 1: JP-A-2007-231302

DISCLOSURE OF THE INVENTION

Problem to be Solved by the Invention

In members which are required to have high precision and strength as in crankshafts, since the straightening ability has not a little affects on the productivity, the straightening ability is expected to be further enhanced, and the fatigue strength is similarly expected.

Then, an object of the invention is to provide a nitrocarburized raw material for crankshafts capable of devising to much more enhance the productivity by devising to further enhance the strength of a microalloyed steel to be subjected to a nitrocarburizing treatment and the straightening ability during straightening process and a method for manufacturing the same.

Means of Solving the Problem

In order to solve the foregoing problems, the nitrocarburized raw material for crankshafts of the invention is a nitrocarburized raw material for crankshafts having a composition composed of from 0.35 to 0.55% of C, from 0.05 to 0.5% of Si, from 0.6 to 1.2% of Mn, from 0.01 to 0.5% of Cu, from 0.01 to 0.5% of Ni, from 0.05 to 0.6% of Cr, from 0.01 to 0.40% of V, from 0.04 to 0.1% of S, from 0.001 to 0.01% of s-Al, from 0.0005 to 0.02% of Ca and from 0.001 to 0.04% of N in terms of % by mass, with the rest being Fe and inevitable impurities, in which the respective components are regulated in such a manner that, when the content of V capable of being solid-soluted in austenite at the time of normalizing heating is defined as [V], and a carbon equivalent is defined as C [eq.], the following expression:

$$C\,[eq.]=C+0.07\times Si+0.16\times Mn+0.19\times Cu+0.17\times Ni+0.2\times Cr+[V]$$

satisfies from 0.58 to 0.89%, and a structure after hot forging and normalizing treatment is ferrite+pearlite, which is characterized in that after smelting a steel having the foregoing composition, hot forging is performed, a normalizing treatment is then applied to the hot forged material at a treatment temperature in the range of from 780° C. to 850° C., and straightening process for correcting bending to be caused due to a nitrocarburizing treatment is later applied.

In that case, when after the hot forging, a normalizing treatment is applied to the nitrocarburized raw material for crankshafts to which a nitrocarburizing treatment is applied at a temperature falling within the temperature range of from 780° C. to 850° C., the straightening ability in the straightening process for correcting bending to be caused due to the nitrocarburizing treatment can be kept high. That is, by regulating the temperature in the normalizing treatment at not higher than 850° C., a lowering of the straightening ability to be caused due to the matter that the hardness is excessively increased at the time of normalizing treatment is prevented; and also, by regulating the temperature of the normalizing treatment at 780° C. or higher, not only influences by hot forging as the preceding step can be surely eliminated, but the fatigue strength can be increased while securing a preferred hardness. According to this, it is possible to provide a nitrocarburized raw material for crankshafts having both of high fatigue strength and high straightening ability and capable of further enhancing a yield rate in the straightening process and devising to much more enhance the productivity.

In the foregoing configuration, the foregoing straightening process may be applied after applying the normalizing treatment at a treatment temperature in the range of from 780° C. to 850° C. and subsequently applying the nitrocarburizing treatment under a condition at a treatment temperature of from 500 to 650° C. for a treatment time of from 1 to 5 hours.

In that case, by performing the nitrocarburizing treatment, not only the strength is sufficiently increased, but the straightening process is applied in a state that the straightening ability is high. Therefore, it is possible to easily correct a strain by means of straightening process after the nitrocarburizing treatment and to manufacture a crankshaft with higher precision and high yield rate.

Also, the method for manufacturing a nitrocarburized raw material for crankshafts of the invention is characterized by smelting a material having a composition composed of from 0.35 to 0.55% of C, from 0.05 to 0.5% of Si, from 0.6 to 1.2% of Mn, from 0.01 to 0.5% of Cu, from 0.01 to 0.5% of Ni, from 0.05 to 0.6% of Cr, from 0.01 to 0.40% of V, from 0.04 to 0.1% of S, from 0.001 to 0.01% of s-Al, from 0.0005 to 0.02% of Ca and from 0.001 to 0.04% of N in terms of % by mass, with the rest being Fe and inevitable impurities, in which the respective components are regulated in such a manner that, when the content of V capable of being solid-soluted in austenite at the time of normalizing heating is defined as [V], and a carbon equivalent is defined as C [eq.], the following expression:

$$C\,[eq.]=C+0.07\times Si+0.16\times Mn+0.19\times Cu+0.17\times Ni+0.2\times Cr+[V]$$

satisfies from 0.58 to 0.89%; subjecting the smelted material to hot forging and thereafter, applying a normalizing treatment to the hot forged material at a treatment temperature in the range of from 780° C. to 850° C. to form a structure of ferrite+pearlite; performing a nitrocarburizing treatment under a condition at a treatment temperature of from 500 to 650° C. for a treatment time of from 1 to 5 hours; and applying straightening process for correcting bending to be caused due to this nitrocarburizing treatment.

In that case, when after the hot forging, a normalizing treatment is applied to the nitrocarburized raw material for crankshafts to which a nitrocarburizing treatment is applied at a temperature falling within the temperature range of from 780° C. to 850° C., the straightening ability in the straightening process for correcting bending to be caused due to the nitrocarburizing treatment can be kept high. That is, by regulating the temperature in the normalizing treatment at not higher than 850° C., a lowering of the straightening ability to be caused due to the matter that the hardness is excessively increased at the time of normalizing treatment is prevented; and also, by regulating the temperature of the normalizing treatment at 780° C. or higher, not only influences by hot forging as the preceding step can be surely eliminated, but the fatigue strength can be increased while securing a preferred hardness. According to this, it is possible to provide a nitrocarburized raw material for crankshafts having both of high fatigue strength and high straightening ability and capable of further enhancing the yield rate in the straightening process and devising to much more enhance the productivity.

Effect of the Invention

According to the invention, it is possible to provide a nitrocarburized raw material for crankshafts having both of high fatigue strength and high straightening ability and capable of further enhancing the yield rate in the straightening process and devising to much more enhance the productivity. Also, it is possible to easily correct a strain by means of straightening process after the nitrocarburizing treatment and to manufacture a crankshaft with higher precision and a high yield rate.

BEST MODES FOR CARRYING OUT THE INVENTION

Figure 1:
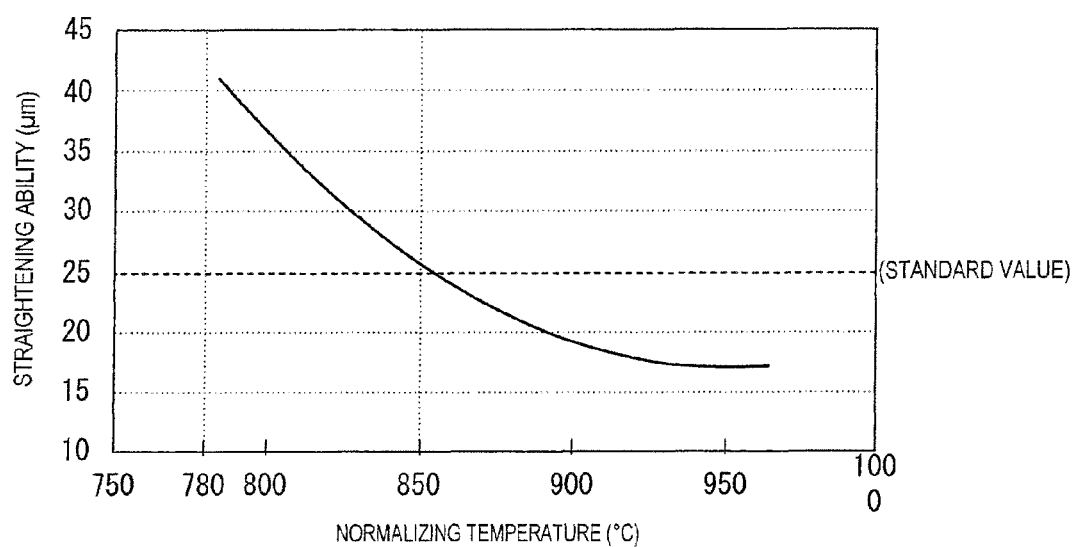
FIG. 1 is a graph showing a straightening ability of a nitrocarburized raw material for crankshafts to which the invention is applied.

Next, embodiments of the invention are hereunder described.

The nitrocarburized raw material for crankshafts to which the invention is applied is one which has a composition composed of from 0.35 to 0.55% of C, from 0.05 to 0.5% of Si, from 0.6 to 1.2% of Mn, from 0.01 to 0.5% of Cu, from 0.01 to 0.5% of Ni, from 0.05 to 0.6% of Cr, from 0.01 to 0.40% of V, from 0.04 to 0.1% of S, from 0.001 to 0.01% of s-Al, from 0.0005 to 0.02% of Ca and from 0.001 to 0.04% of N in terms of % by mass, with the rest being Fe and inevitable impurities and in which the respective components are regulated in such a manner that, when the content of V capable of being solid-soluted in austenite at the time of normalizing heating is defined as [V], and a carbon equivalent is defined as C [eq.], the following expression:

$$C\,[eq.] = C + 0.07 \times Si + 0.16 \times Mn + 0.19 \times Cu + 0.17 \times Ni + 0.2 \times Cr + [V]$$

satisfies from 0.58 to 0.89%.

A cause that a crack in a nitrocarburized raw material for crankshafts composed of a V-containing microalloyed steel is easily generated at the time of straightening after the nitrocarburizing treatment resides in the matter that V forms a hard nitride on the surface layer during the nitrocarburizing treatment, thereby making the surface layer of the steel hard. When V minutely deposits a hard carbide, the steel becomes hard and high in strength, whereby endurance fatigue characteristics or fatigue strength of a crankshaft increases. On the other hand, in the straightening process after the nitrocarburizing treatment, when the steel becomes harder, a required load for straightening becomes high, and a generated stress becomes high. Therefore, a crack is easily generated.

Then, when the content of V capable of being solid-soluted in austenite ($\gamma$) at the time of normalizing heating is defined as [V], and a carbon equivalent is defined as C [eq.], by regulating the carbon equivalent C [eq.] represented by the following expression:

$$C\,[eq.] = C + 0.07 \times Si + 0.16 \times Mn + 0.19 \times Cu + 0.17 \times Ni + 0.2 \times Cr + [V]$$

at from 0.58 to 0.89%, namely by regulating the respective components such that the carbon equivalent C [eq.] takes such a value, not only necessary hardness is obtained, but the crankshaft is able to realize favorable fatigue strength even after the straightening process. That is, when C [eq.] is 0.58% or more, the hardness after the nitrocarburizing treatment is high, and desired fatigue strength is obtained. Thus, such is preferable. When C [eq.] is not more than 0.89%, the hardness after the nitrocarburizing treatment does not become excessively hard; the straightening ability is not impaired; and furthermore, necessary machinability is kept. Thus, such is preferable.

Here, the reason why V which controls the carbon equivalent C [eq.] is specified by not merely the addition amount in the steel but the solid soluting amount [V] in $\gamma$ (austenite) is as follows. That is, only V solid-soluted in $\gamma$ deposits a minute carbide or nitride upon subsequent cooling, thereby acting to increase the hardness of the steel, namely it directly controls the fatigue strength as a crankshaft.

Also, the structure of the nitrocarburized raw material for crankshafts is considered as follows.

In the initial stage where a strain at the time of straightening is small, a crack is generated on a compound layer on the surface; when the strain increases, a crack is generated in a pearlite grain, which hereinafter referred to as "pearlite block", of a single unit which is brought into contact with the compound layer; when the strain further increases, the crack generated in the pearlite block of a single unit acts as an initial crack, and the crack proceeds in the more internal ferrite or pearlite; and this impairs an endurance fatigue life of the crankshaft.

Accordingly, the smaller the size of the pearlite block of a single unit which is brought into contact with the compound layer, the shorter the length of the initial crack; and the shorter the length of the initial crack, the more difficult the progress of the crack.

For that reason, for the purpose of enhancing the straightening ability, it is necessary to decrease the size of the pearlite block.

In a microalloyed steel including a nitrocarburized raw material for crankshafts, in general, after heating at 1,200° C. or higher, forging is completed at 950° C. or higher, and the steel is allowed to stand for cooling as it is. Therefore, its structure is configured of a mixed structure of pro-eutectoid ferrite depositing along the old austenite grain boundaries, with the rest being pearlite. On the other hand, in the thermal refined steel, heating is performed in a temperature region in the vicinity of 800° C., and cooling is then performed; and therefore, the old austenite grain does not become coarse but becomes minute. Thus, its structure is configured of a mixed structure of minute ferrite and pearlite.

In comparison with the thermal refined steel, the microalloyed steel including a nitrocarburized raw material for crankshafts is large in the old austenite grain and large in quenching properties. Therefore, ferrite transformation is suppressed, ferrite is hardly deposited, and a major part of austenite is easy to form pearlite.

For that reason, the size of the pearlite block becomes large easily as compared with the thermal refined steel, and this becomes a cause to reduce the straightening ability. Then, in this embodiment, for the purpose of enhancing the straightening ability of the foregoing raw material, normalizing treatment is applied when manufacturing a nitrocarburized raw material for crankshafts, and minute the crystal grain, thereby minimizing the size of the formed pearlite block and uniformly dispersing it.

In particular, by performing this normalizing treatment at a treatment temperature in the range of from 780° C. to 850° C., it becomes possible to enhance the straightening ability and to much more increase the fatigue strength.

When the treatment temperature of the normalizing treatment is regulated at 780° C. or higher, it is possible to eliminate influences of the hot forging as the pre-process due to the austenite transformation and to minute the crystal grain. Also, by solid soluting V, it is possible to increase the hardness and to much more increase the fatigue strength. On the other hand, when the temperature of the normalizing treatment is regulated at not higher than 850° C., it is possible to increase the hardness within the range where a lowering of the straightening ability (also called "bending correction properties") after the nitrocarburizing treatment is not caused, and a possibility that a crack is generated at the time of straightening process becomes extremely low. According to this, it is possible to further enhance the production efficiency due to an enhancement of a yield rate or the like.

The matter that a lower limit of the normalizing temperature has been set at 780° C. is described in detail.

It is generally known that the normalizing treatment is a treatment in which a material is heated at a temperature of about 50° C. higher than Ac3 as a transformation point thereof to form a uniform austenite structure and then allowed to stand for cooling in air. By performing such a treatment, it is possible to expect to realize (1) minuteness of the metallic structure of forged goods and improvement of mechanical properties, (2) enhancement of machinability, and the like.

Now, it is known that the temperature of the Ac3 transformation point is determined according to the following expression:

$$Ac3(°C.): 854-180\times(\% C)-14\times(\% Mn)+44\times(\% Si)-17.8\times(\% Ni)-1.7\times(\% Cr) \quad (1)$$

In the material in this embodiment, the Ac3 point exists within the range of from 730° C. to 804° C. Accordingly, it is preferable that the lower limit of the normalizing temperature in this embodiment is 780° C., a value of which is obtained by adding 50° C. to the lower limit (730° C.) of the Ac3 point in the material of this embodiment.

Also, the reasons why the composition of the raw material has been restricted as described previously are hereunder described in detail.

C: 0.35 to 0.55%

C is added for the purpose of enhancing the strength. In order to obtain an enhancement of necessary strength, it is preferable that the content is 0.35% or more; and in order that a lowering of machinability or toughness may not be caused, it is preferable that the content does not exceed 0.55%.

Si: 0.05 to 0.5%

Si is an element, which is contained for the purpose of deoxidization and strengthening of pro-eutectoid ferrite. The content at which these effects can be obtained, and a lowering of hot processability or toughness is not caused is favorably from 0.05 to 0.5%.

Mn: 0.6 to 1.2%

Mn is an element which works for effectively increasing the hardness of the interior of a machine parts using the foregoing raw material and which is contained for the purpose of enhancing the toughness. In order to obtain necessary hardness and toughness, the content is preferably 0.6% or more; and the content is preferably not more than 1.2% such that a lowering of the toughness due to the formation of bainite after hot process or at the time of normalizing is not caused.

Also, Mn is an element, which is important for forming a sulfide together with S as described below and is an element, which is effective for enhancing the machinability.

S: 0.04 to 0.1%

S is an element, which is effective for enhancing the machinability. In order to obtain necessary machinability, the content is preferably 0.04% or more. On the other hand, the content is preferably not more than 0.1% such that a lowering of the hot processability or fatigue strength is not caused or that clogging of a nozzle at the time of casting upon the formation of high-melting CaS with Ca is not caused.

Cu: 0.01 to 0.5%

Ni: 0.01 to 0.5%

Both Cu and Ni are an element, which works for effectively increasing the hardness of the interior of a machine parts using the foregoing raw material and is also an element, which is contained for the purpose of enhancing the toughness. In order to obtain these effects, the content is preferably 0.01% or more. On the other hand, even when the content of Cu exceeds 0.5%, or the content of Ni exceeds 0.5%, not only the effects are saturated, but the costs of the machine parts become high from the economical viewpoint. Thus, the content is preferably not more than 0.5%.

Cr: 0.05 to 0.6%

Cr works for effectively increasing the hardness of the interior of a machine parts using the foregoing raw material and is an element for the purpose of enhancing the toughness. In order to obtain necessary toughness, the content is preferably 0.05% or more. On the other hand, when the content is not more than 0.6%, a lowering of the toughness due to the formation of bainite upon air cooling after hot process is not caused, and furthermore, a lowering of the straightening ability due to deposition of a minute nitride in the nitriding layer at the time of nitrocarburizing treatment by influences of Cr and an increase of the hardness is not caused. Therefore, the content is preferably not more than 0.6%.

Ca: 0.0005 to 0.02%

Ca is an element which is contained for the purposes of forming a protective membrane on a tool at the time of lathe turning due to the presence as CaS in a sulfide and largely enhancing the tool life. When the content is 0.0005% or more, the effects are obtained. When the content is not more than 0.02%, clogging of a nozzle at the time of casting upon the formation of high-melting CaS is not caused, and therefore, such is favorable.

s-Al: 0.001 to 0.01%

Similar to Si, s-Al is used as a deoxidizing element when smelting a steel.

It is necessary that the content is at least 0.001% or more. Also, when the content is more than 0.01%, a minute nitride is deposited in the nitriding layer at the time of nitrocarburizing treatment, and the hardness is increased. Thus, in order to avoid a lowering of the straightening ability due to excessive addition, the content is preferably not more than 0.01%.

N: 0.001 to 0.04%

N is an element which is contained for the purpose of preventing coarseness of a crystal grain. When the content is 0.001% or more, an effect for preventing coarseness of a crystal grain is obtained. On the other hand, even when the content is more than 0.04%, the effect is saturated. Thus, the content is preferably not more than 0.04%.

V: 0.01 to 0.40%

V is an element which is contained for the purpose of minutely depositing a carbonitride during cooling after hot process to increase the hardness. When the content is 0.01% or more, the effect is obtained. Even when the content is more than 0.40%, the effect is saturated, not only such is economically disadvantageous, but the straightening ability is lowered. Thus, the content is preferably not more than 0.40%.

In this embodiment, 14 kinds of materials as shown in the following Table 1 were used as an example for the foregoing raw material. All of these materials are composed of a composition specified in the invention. In Table 1, values in the case of heating at 800° C. in the normalizing treatment are listed for [V] and C [eq.].

mixed salt containing sodium cyanide (NaCNO), potassium cyanide (KCNO) and the like). For this salt bath nitrocarburizing treatment, the temperature was set at 580° C., and the time was set at 100 minutes.

Then, respective characteristics of straightening ability, machinability and fatigue strength were evaluated. These specific evaluation methods are as follows.

<Straightening Ability>

After smelting a steel of each of the foregoing compositions, the steel was subjected to hot forging in a shape of a crankshaft at a temperature of 1,200° C.; thereafter, a normalizing treatment was applied at the foregoing temperature; after this normalizing treatment, machining including gun drilling was performed; after the machining, a salt bath nitrocarburizing treatment (580° C.×100 minutes) was applied, thereby preparing a practical crankshaft.

The obtained crankshaft was subjected to a three-point bending test by applying a concentrated load at a center portion of the journal while supporting both end portions of the journal at a distance between the supports of 400 mm.

In this test, the load was applied until a crack was generated at the center portion of the journal, and a maximum amount of strain and amount of displacement of rotational axis after removing the load was determined as the straightening ability of the crankshaft.

<Machinability>

After smelting a steel of each of the foregoing compositions, the steel was subjected to hot forging in a shape of a crankshaft at a temperature of 1,200° C.; thereafter, a normalizing treatment was applied at the foregoing temperature, thereby preparing a specimen. This specimen was subjected to gun drilling and evaluated while defining a wear level of a cutter following this drilling as an index of machinability.

For cutting, a cemented carbide-made gun drill having a diameter of 5.4 mm was used, and the following cutting condition was adopted.

TABLE 1

| | | C | Si | Mn | Cu | Ni | Cr | V | S | s-Al | Ca | N | [V] 800° C. | C [eq.] 800° C. |
|---|---|---|---|---|---|---|---|---|---|---|---|---|---|---|
| | No. 1 | 036 | 0.15 | 0.70 | 0.11 | 0.09 | 0.17 | 0.16 | 0.05 | 0.004 | 0.0018 | 0.010 | 0.03 | 0.58 |
| | No. 2 | 0.54 | 0.14 | 0.71 | 0.10 | 0.10 | 0.15 | 0.14 | 0.06 | 0.005 | 0.0020 | 0.011 | 0.03 | 0.76 |
| | No. 3 | 0.44 | 0.05 | 0.70 | 0.10 | 0.10 | 0.15 | 0.15 | 0.05 | 0.004 | 0.0045 | 0.012 | 0.03 | 0.65 |
| | No. 4 | 0.43 | 0.50 | 0.70 | 0.10 | 0.10 | 0.15 | 0.15 | 0.05 | 0.005 | 0.0035 | 0.010 | 0.03 | 0.67 |
| | No. 5 | 0.44 | 0.14 | 0.62 | 0.10 | 0.10 | 0 15 | 0.15 | 0.06 | 0.005 | 0.0028 | 0.013 | 0.03 | 0.64 |
| | No. 6 | 0.45 | 0.15 | 1.19 | 0.10 | 0.09 | 0.16 | 0.15 | 0.05 | 0.005 | 0.0030 | 0.012 | 0.03 | 0.75 |
| | No. 7 | 0.46 | 0.15 | 0.70 | 0.05 | 0.08 | 0.15 | 0.13 | 0.07 | 0.004 | 0.0028 | 0.011 | 0.03 | 0.66 |
| | No. 8 | 0.45 | 0.15 | 0.69 | 0.50 | 0.10 | 0.14 | 0.15 | 0.06 | 0.005 | 0.0033 | 0.012 | 0.03 | 0.74 |
| | No. 9 | 0.44 | 0.15 | 0.70 | 0.10 | 0.06 | 0 15 | 0.15 | 0.05 | 0.005 | 0.0040 | 0.010 | 0.03 | 0.65 |
| | No. 10 | 0.44 | 0.12 | 0.70 | 0.10 | 0.49 | 0 15 | 0 13 | 0.07 | 0.005 | 0.0026 | 0.011 | 0.03 | 0.72 |
| | No. 11 | 0.45 | 0.13 | 0.68 | 0.10 | 0.10 | 0.05 | 0.15 | 0.07 | 0.005 | 0.0027 | 0.012 | 0.03 | 0.64 |
| | No. 12 | 0.41 | 0.15 | 0.70 | 0.10 | 0.07 | 0.55 | 0.14 | 0.06 | 0.004 | 0.0030 | 0.013 | 0.03 | 0.70 |
| | No. 13 | 0.45 | 0.15 | 0.70 | 0.10 | 0.10 | 0.15 | 0.02 | 0.06 | 0.005 | 0.0028 | 0.012 | 0.02 | 0.66 |
| | No. 14 | 0.40 | 0.13 | 0.64 | 0.06 | 0.11 | 0.14 | 0.32 | 0.07 | 0.005 | 0.0033 | 0.012 | 0.03 | 0.60 |
| Target value | Lower limit | 0.35 | 0.05 | 0.6 | 0.01 | 0.01 | 0.05 | 0.01 | 0.04 | 0.001 | 0.0005 | 0.001 | 0.03 | 0.58 |
| | Upper limit | 0.55 | 0.5 | 1.2 | 0.5 | 0.5 | 0.6 | 0.40 | 0.1 | 0.01 | 0.02 | 0.04 | 0.03 | 0.89 |

In this embodiment, after smelting a steel having each of the chemical compositions as shown in Table 1, hot forging was performed at a temperature of 1,200° C., thereby obtaining a crankshaft having size and shape of φ50×1,000 mm.

This crankshaft was subjected to a normalizing treatment at various temperatures in the range of from 750° C. to 1,000° C. In this normalizing treatment, a condition under which the crankshaft was heated and kept at each of the foregoing temperatures for 60 minutes and then allowed to stand for cooling to room temperature was adopted.

Subsequently, the foregoing crankshaft was subjected to a salt bath nitrocarburizing treatment using a salt bath agent (a Rotation speed: 4,300 r.p.m. (revolutions per minute)

Feed: 0.06 mm/rotation

Hole depth: 67 mm

<Fatigue Strength>

A practical crankshaft prepared in the same manner as in the evaluation of the straightening ability was prepared and subjected to a rotating bending fatigue test. This test was performed by changing a maximum load applied in various ways, and a maximum load applied at which breakage was not generated after 10,000,000 revolutions was determined as the fatigue strength.

FIG. 1 is a graph showing a straightening ability of a nitrocarburized raw material for crankshafts.

In this FIG. 1, the vertical axis represents a strain amount (μm) after the generation of a crack as the index of straightening ability; and the horizontal axis represents a temperature condition of the normalizing treatment.

As shown in FIG. 1, there appeared a tendency that the lower the normalizing temperature, the higher the straightening ability. In detail, it has become clear that when the temperature of the normalizing treatment is not higher than 850° C., a more favorable straightening ability than a standard value (25 μm) set up as a preferred straightening ability is obtained. It is considered that this is caused due to the matter that when the temperature at the time of normalizing treatment is high, solid soluting of V proceeds, whereby the hardness is increased. Also, even when the temperature of the normalizing treatment was lower than 800° C., the straightening ability never fell below the standard value.

Figure 2:
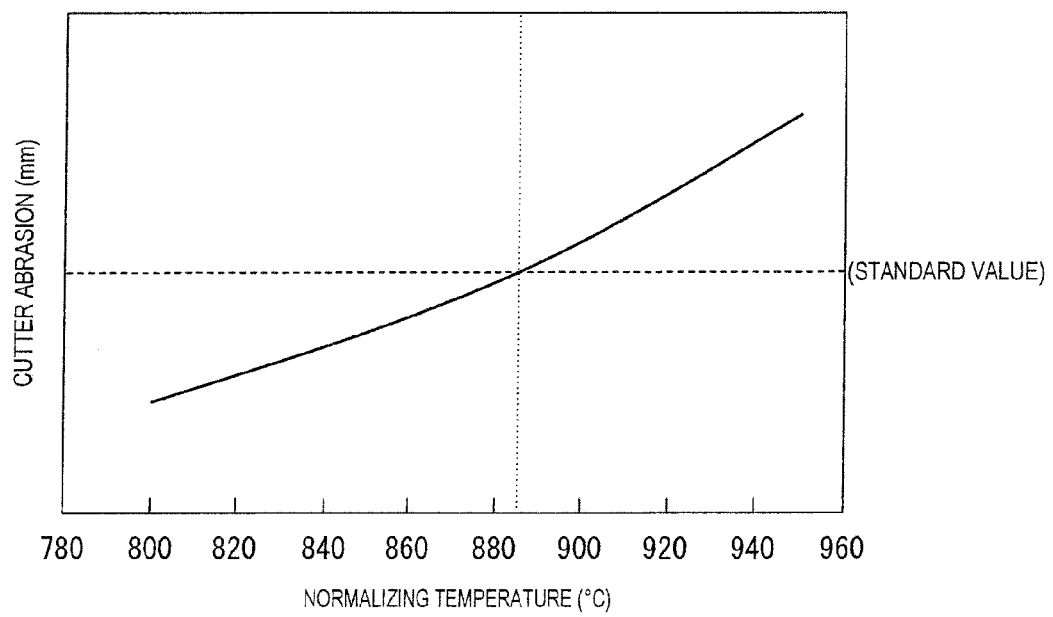
FIG. 2 is a graph showing cutter wear property of a nitrocarburized raw material for crankshafts.

FIG. 2 is a graph showing cutter wear property of a nitrocarburized raw material for crankshafts.

In FIG. 2, the vertical axis represents a degree of wear of a cutter; and the horizontal axis represents a temperature condition of the normalizing treatment.

As shown in this FIG. 2, it has become clear that the lower the normalizing temperature, the smaller the wear of the cutter, namely the more favorable the machinability. When the normalizing temperature exceeds about 880° C., the wear of the cutter exceeds the standard value which is considered to be preferable. Therefore, it has become clear that as in the invention, when the temperature of the normalizing temperature is regulated at not higher than 850° C., the preferred standard value of machinability is satisfied; and even when the temperature of the normalizing temperature was lower than 800° C., the machinability never exceeded the standard value. Here, the standard value is, for example, 0.3 mm.

Figure 3:
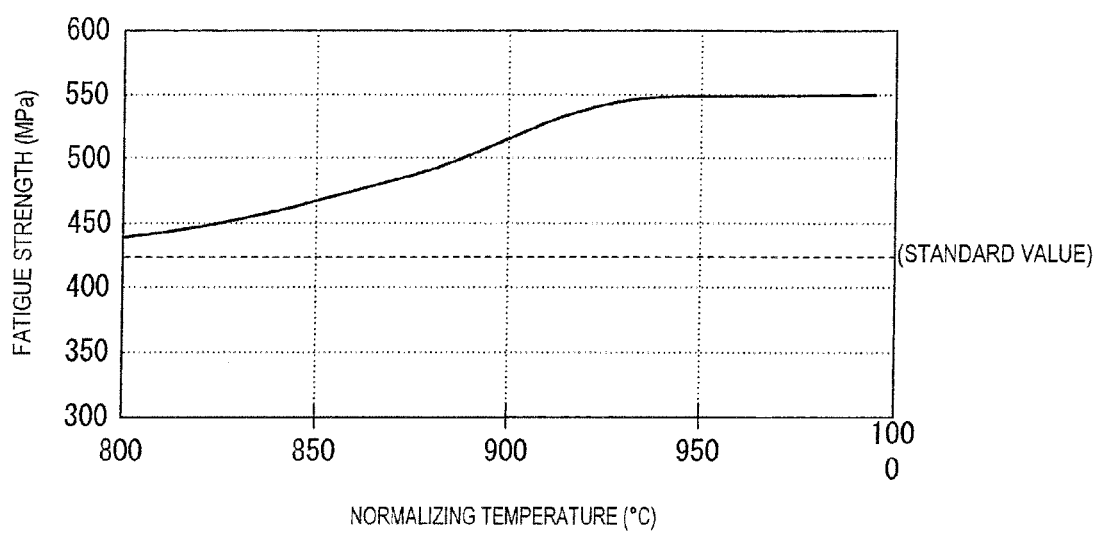
FIG. 3 is a graph showing fatigue strength of a nitrocarburized raw material for crankshafts.

FIG. 3 is a graph showing fatigue strength of a nitrocarburized raw material for crankshafts.

In FIG. 3, the vertical axis represents the foregoing maximum load applied (MPa) as an index expressing the fatigue strength; and the horizontal axis represents a temperature condition of the normalizing treatment.

As shown in this FIG. 3, it has become clear that the higher the normalizing temperature, the higher the fatigue strength. It is thought that this is caused due to the matter that when the temperature at the time of normalizing treatment is high, solid soluting of V proceeds, whereby the hardness is increased. The fatigue strength never fell below the preferred standard value over the whole of the range where the normalizing temperature is 780° C. or higher and not higher than 1,000° C.

In the case of using a nitrocarburized raw material for crankshafts having a composition composed of from 0.35 to 0.55% of C, from 0.05 to 0.5% of Si, from 0.6 to 1.2% of Mn, from 0.01 to 0.5% of Cu, from 0.01 to 0.5% of Ni, from 0.05 to 0.6% of Cr, from 0.01 to 0.40% of V, from 0.04 to 0.1% of S, from 0.001 to 0.01% of s-Al, from 0.0005 to 0.02% of Ca and from 0.001 to 0.04% of N in terms of % by mass, with the rest being Fe and inevitable impurities, in which the respective components are regulated in such a manner that, when the content of V capable of being solid-soluted in austenite at the time of normalizing heating is defined as [V], and a carbon equivalent is defined as C [eq.], the following expression:

$$C\,[eq.] = C + 0.07 \times Si + 0.16 \times Mn + 0.19 \times Cu + 0.17 \times Ni + 0.2 \times Cr + [V]$$

satisfies from 0.58 to 0.89%, smelting this raw material, applying hot forging to the smelted material, then applying a normalizing treatment to the hot forged material at a treatment temperature in the range of from 780° C. to 850° C. to form ferrite+pearlite, applying a nitrocarburizing treatment under a condition at a treatment temperature of from 500 to 650° C. for from 1 to 5 hours and applying straightening process for correcting bending to be caused due to this nitrocarburizing treatment, by regulating the temperature at the time of normalizing treatment so as to fall within the range of from 780° C. to 850° C., the straightening ability in the straightening process for eliminating a strain after the nitrocarburizing treatment can be enhanced while securing favorable fatigue strength; a yield rate of this straightening process can be increased; and it is possible to devise to enhance the production efficiency. Also, by applying the normalizing treatment at the foregoing temperature, it is possible to bring favorable machinability.

Namely, in the case of manufacturing a crankshaft using the foregoing raw material, it is preferable that the following steps are included:

smelting a steel which satisfies the foregoing composition;

subjecting the smelted steel to hot forging to form a shape of a crankshaft;

after the hot forging, applying a normalizing treatment at a temperature of from 780° C. to 850° C.;

after the normalizing treatment, performing machining; and after the machining, applying a nitrocarburizing treatment under a condition at a treatment temperature of from 500 to 650° C. for a treatment time of from 1 to 5 hours, thereby preparing a practical crankshaft.

According to this, it is possible to provide a nitrocarburized raw material for crankshafts having both of high fatigue strength and high straightening ability and capable of further enhancing a yield rate in the straightening process and devising to much more enhance the productivity. Also, by performing the nitrocarburizing treatment, the strength is sufficiently increased, and straightening process is applied in a state that the straightening ability is high. Therefore, it is possible to easily correct a strain by means of straightening process after the nitrocarburizing treatment and to manufacture a crankshaft with higher precision and high yield rate rate.

While the embodiments of the invention have been described in detail, it should not be construed that the invention is limited thereto. For example, in evaluating the foregoing raw material, while the case of applying a salt bath nitrocarburizing treatment as an example of the nitrocarburizing treatment has been described, as a matter of course, it is possible to apply a gas nitrocarburizing treatment or an plasma nitriding treatment or the like, and conditions for the nitrocarburizing treatment are arbitrary. Similarly, conditions for the foregoing smelting, hot forging and machining of the raw material can be properly varied.

Also, the nitrocarburized raw material for crankshafts of the invention can be applied to crankshafts of various internal combustion engines to be used in four-wheel automobiles, motorcycles or other applications. The applications are not limited at all, but the invention can be carried out in embodiments to which various modifications are added within the scope where the intent thereof is not deviated.

The invention claimed is:

1. A nitrocarburized raw material for crankshafts that has a composition composed of from 0.35 to 0.55% of C, from 0.05 to 0.5% of Si, from 0.6 to 1.2% of Mn, from 0.01 to 0.5% of Cu, from 0.01 to 0.5% of Ni, from 0.05 to 0.6% of Cr, from 0.15 to 0.40% of V, from 0.04 to 0.1% of S, from 0.001 to 0.01% of s-Al, from 0.0005 to 0.02% of Ca and from 0.001 to 0.04% of N in terms of % by mass, with the rest being Fe and inevitable impurities, wherein the respective components are regulated in such a manner that carbon equivalent defined as C [eq.] represented by the following expression:

$$C\,[eq.] = C + 0.07 \times Si + 0.16 \times Mn + 0.19 \times Cu + 0.17 \times Ni + 0.2 \times Cr + [V]$$

satisfies from 0.58 to 0.89%, [V] representing the content of V capable of being solid-soluted in austenite at the time of normalizing heating under a normalizing treatment, and wherein the nitrocarburized raw material has a structure of ferrite+pearlite after being subjected to hot forging and the normalizing treatment, and comprises a resultant material obtained by smelting a steel having the foregoing composition, performing the hot forging, applying the normalizing treatment to the hot forged material at a treatment temperature in the range of from 780° C. to 850° C. which enables V to be solid-soluted in austenite by an amount of [V] which is capable of keeping C[eq.] in the range from 0.58 to 0.89%, preventing the size of the pearlite block from being enlarged, further increasing hardness and further enhancing fatigue strength without lowering straightening ability, applying a nitrocarburizing treatment under a condition at a treatment temperature of from 500 to 650° C. for a treatment time of from 1 to 5 hours, and then applying a straightening process for correcting bending caused by the nitrocarburizing treatment to provide straightening ability of not less than 25 μm.

2. A method for manufacturing a nitrocarburized raw material for crankshafts, which is characterized by:

smelting a material having a composition composed of from 0.35 to 0.55% of C, from 0.05 to 0.5% of Si, from 0.6 to 1.2% of Mn, from 0.01 to 0.5% of Cu, from 0.01 to 0.5% of Ni, from 0.05 to 0.6% of Cr, from 0.15 to 0.40% of V, from 0.04 to 0.1% of S, from 0.001 to 0.01% of s-Al, from 0.0005 to 0.02% of Ca and from 0.001 to 0.04% of N in terms of % by mass, with the rest being Fe and inevitable impurities, in which the respective components are regulated in such a manner that, when the content of V capable of being solid-soluted in austenite at the time of normalizing heating is defined as [V], and a carbon equivalent is defined as C [eq.], the following expression:

$$C\,[eq.] = C + 0.07 \times Si + 0.16 \times Mn + 0.19 \times Cu + 0.17 \times Ni + 0.2 \times Cr + [V]$$

satisfies from 0.58 to 0.89%, applying hot forging to the smelted material and thereafter, subjecting the hot forged material to a normalizing treatment at a treatment temperature in the range of from 780° C. to 850° C. to form a structure of ferrite+pearlite, grain size of pearlite block is prevented from being enlarged, and straightening process for correcting bending caused by a nitrocarburizing treatment after the nitrocarburizing treatment provides straightening ability of not less than 25 μm, performing a nitrocarburizing treatment under a condition at a treatment temperature of from 500 to 650° C. for a treatment time of from 1 to 5 hours, and applying straightening process for correcting bending to be caused due to this nitrocarburizing treatment.

* * * * *